Oct. 4, 1927.
C. C. FARMER ET AL
1,644,567
LOAD BRAKE DEVICE
Filed Jan. 2, 1926
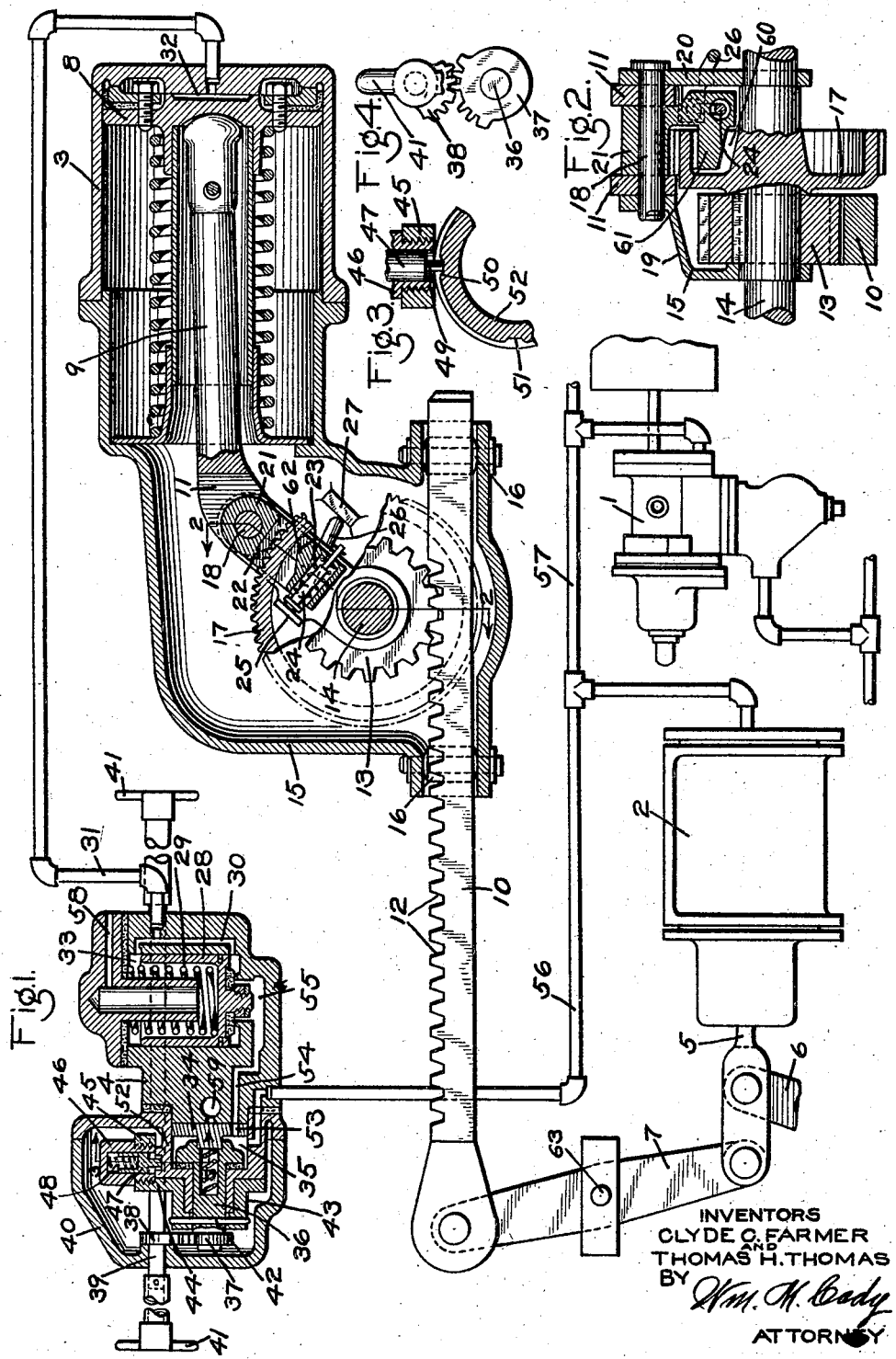
INVENTORS
CLYDE C. FARMER
AND
THOMAS H. THOMAS
BY
Wm. M. Cady
ATTORNEY Patented Oct. 4, 1927.

1,644,567

UNITED STATES PATENT OFFICE.

CLYDE C. FARMER, OF PITTSBURGH, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

LOAD-BRAKE DEVICE.

Application filed January 2, 1926. Serial No. 78,766.

This invention relates to a fluid pressure brake apparatus of the type in which the brakes may be applied with greater power on a loaded car than on an empty car.

One object of our invention is to provide means for supplying fluid under pressure to a load brake cylinder when the pressure in the empty brake cylinder has been increased to a predetermined degree.

Another object of our invention is to provide an improved take-up mechanism by which the load brake cylinder is connected up to apply power after the empty brake cylinder has operated.

In the accompanying drawing; Fig. 1 is a diagrammatic view, partly in section, of an empty and load fluid pressure brake equipment embodying our invention; Fig. 2 a section on the line 2—2 of Fig. 1; Fig. 3 a section on the line 3—3 of Fig. 1; and Fig. 4 a partial end view, with the casing removed, of the manually operated means for setting the apparatus either for empty or loaded car braking.

The apparatus shown in Fig. 1 of the drawing comprises a triple valve device 1, or other valve device adapted to control the admission and exhaust of fluid under pressure to and from a brake cylinder, an empty car brake cylinder 2, a loaded car brake cylinder 3, and a combined manually controlled valve device and load brake cylinder controlling valve device 4.

The brake cylinder piston rod 5 of the brake cylinder 2 is connected to a brake lever 6, through which power is transmitted to apply the brakes to the wheels of the car in the usual manner. The rod 5 is also connected to a brake lever 7, through which the load brake cylinder 3 transmits power to apply the brakes.

The load brake cylinder 3 contains a brake cylinder piston 8 adapted to operate piston rod 9, and interposed between the rod 9 and the brake lever 7 is a take-up mechanism comprising a rack bar 10 having one end pivotally connected to the levers 7 and provided with teeth 12 adapted to mesh with the teeth of a gear 13.

The gear 13 is secured to a stub shaft 14 having bearings in a casing 15, which is secured to the brake cylinder 3, the rack bar 10 being guided in its movement by engagement with rollers 16, which are rotatably mounted in the casing in pairs, with the bar disposed between the rollers of each pair.

Also secured to the shaft 14 is a ratchet wheel 17 and connected to the end of the piston rod 9 at opposite sides by a pivot pin 18 are links 19 and 20, which have bearings on the shaft 14 at their opposite ends, so that the links support the end of the piston rod and cause it to move in the arc of a circle about the axis of the shaft 14.

The end 11 of the piston rod 9 is bifurcated and in the space so formed and mounted on the pin 18, is a ratchet pawl member 21 having a ratchet tooth 22 adapted to engage the teeth of the ratchet wheel 17.

The ratchet wheel 17 is provided with an annular recess 60 into which extends a lug 61, formed on the pawl member 21, said lug having a blunt tooth 62 adapted to grip the internal annular face of the ring portion of the ratchet wheel 17, when the tooth 22 engages with the the teeth of said wheel. In the extended portion of the pawl member 21 which carries the lug 61 a socket is provided in which a coil spring 23 is disposed. Said spring acts against the head of a pin 24, which in turn engages a lug 25 carried by the link 20, so that when the pawl member 21 is free to move, said member is moved by the spring to cause the tooth 22 to engage the teeth of the ratchet wheel 17. The pawl member 17 is provided with a release finger 26 which is adapted to be moved with the pawl member 17 upon the release movement of the piston rod 9 to engage a lug 27 carried by the casing 15, so as to shift the pawl member and cause the tooth 22 to be thrown out of engagement with the teeth of the ratchet wheel 17, against the resistance of the spring 23.

In the valve device 4 is provided a valve piston 28 adapted to seat in opposite directions and subject to the pressure of a coil spring 29.

A port 30 leads from the chamber at the outer lower seated area of the valve piston 28 and is connected through a pipe 31 with the piston chamber 32 of the load brake cylinder 3, and said port also extends upwardly and opens into the spring chamber 33 when the valve piston is seated on its lower seat.

The valve device 4 also includes a rotary valve 34, contained in valve chamber 35 and provided with an operating stem 36, to the end of which is secured a gear segment 37. The teeth of said gear segment mesh with the teeth of another gear segment 38 which is secured to an operating shaft 39 having a bearing in the casing 40 which encloses the rotary valve mechanism. The shaft 39 extends out through the casing in opposite directions and is provided at each end with a manually operable handle 41, so that the rotary valve may be operated from either side of the car. It should be understood that the valve device 4 is shown as a distorted section in the drawing, for the sake of clearness, and that the actual position of the parts, such as the member 46, is such that they do not interfere with the extension of the shaft 39 from one side of the car to the other.

Secured to the stem 36 by a pin 42 is a sleeve 43 having a flange 44 provided with a lug 45 and secured to said lug is spring stop holder 46 containing a stop pin 47 which is subject to the pressure of a spring 48. Said pin is provided with an extended portion 49 of reduced diameter, which is adapted to engage notches 50 and 51 provided in an annular inwardly extending portion 52 of the casing 40.

In operation, if it is desired to set the apparatus for loaded car braking, the handle 41 is operated to rotate the stem 36 through the gear segments 38 and 37 to the load position, in which the pin portion 49 impositively engages in the notch 50, as shown in Fig. 3. In this position, a port 53 in the rotary valve 34 connects chamber 35 with passage 54 which leads to chamber 55, open to the inner seated area of the valve piston 28. The chamber 35 is connected to pipe 56 which is open to pipe 57, through which fluid under pressure is supplied by operation of the triple valve device 1 to the empty brake cylinder 2.

It will thus be seen that when an application of the brakes is effected, fluid at the pressure supplied to the brake cylinder 2 is also supplied through the rotary valve 34 to chamber 55.

When the pressure in chamber 55 has been increased to a predetermined degree, dependent upon the setting of the spring 29, and which may be when the pressure in the brake cylinder 2 has been increased to 8, 10, or 12 pounds, for example, the valve piston will be lifted from its lower seat, and the full area of the valve piston 28 being then exposed to the pressure in chamber 55, the valve piston will be quickly and positively shifted to its upper seat. In this position, the port 30 is cut off from communication with the spring chamber 33, and communication is opened from the chamber 55 to passage 30 and pipe 31, so that fluid under pressure is now supplied to piston chamber 32 of the load brake cylinder 3.

In the meantime, fluid under pressure supplied to the empty brake cylinder 2 has moved the brake cylinder piston 5 outwardly, so as to operate the brake lever 6 to apply the brakes with a pressure proportional to the pressure in the brake cylinder 2. The lever 7 is also moved about its fulcrum pin 63, so that the rack bar 10 is moved toward the right.

In the release position of the load brake cylinder piston 8, as shown in Fig. 1, the finger 26 engages the lug 27, so that the pawl member 21 is held in its release position, with the pawl 22 out of engagement with the ratchet wheel 17, and consequently the ratchet wheel 17 and the gear 13 are free to rotate. As the rack bar 10 moves to the right, the gear 13 is therefore rotated. When fluid under pressure is supplied to the load brake cylinder 3, as hereinbefore described, however, the piston 8 is moved outwardly and the piston rod 9 rocks the pawl member 21 in a counter-clockwise direction, so that the finger 26 is moved away from the lug 27, permitting the spring 23 to act through the pin 24 and against the lug 25, to thereby cause the pawl member 21 to be shifted and the tooth 22 to engage the teeth of the ratchet wheel 17 and the tooth 62 to grip the internal annular face of the ratchet wheel.

Further movement of the load brake cylinder piston 8 and the piston rod 9 then operates to rotate the ratchet wheel 17 and thereby the gear 13, so that the rack bar 10 is pulled toward the right and thereby the brakes are applied with increased power, due to the pressure transmitted from the load brake cylinder.

When the brakes are released, fluid under pressure is released from the empty brake cylinder 2 and also from the load brake cylinder 3, through pipes 56 and 57, and when the pressure has fallen to a predetermined degree, for example, five pounds, the valve piston 28 will move from its upper seat, and will open the port 30 to the spring chamber 33, so that brake cylinder pressure will then be admitted to said chamber to cause a quick and positive snap-like movement of the valve piston to its lower seat. In the lower seated position of the valve piston 28, fluid under pressure remaining in the load brake cylinder 3 will be released by way of port 30, spring chamber 33 and exhaust port 58.

As the load brake cylinder piston 8 moves to release position, the finger 26 engages the lug 27 and thereby causes the pawl member 21 to be shifted so as to release the tooth 22 from engagement with the ratchet wheel 17, in readiness for the next brake application.

If it is desired to cut the load brake out of action, the handle 41 is turned to the empty car position, in which the sleeve 43 is rotated so that the pin portion 49 engages in the notch 51. The rotary valve 34 is then rotated to a position in which communication from pipe 56 to chamber 55 is cut off and in order to prevent possible accumulation of fluid pressure in chamber 55 by leakage, the passage 54 may be connected to an exhaust port 59, in this position, through a cavity (not shown) in the rotary valve 34.

Having now described our invention, what we claim as new and desire to secure by Letters Patent, is:—

1. In a load brake apparatus, the combination with an empty brake cylinder and a load brake cylinder, of a valve device operated upon a predetermined increase in pressure of fluid supplied to the empty brake cylinder for opening communication through which fluid under pressure is supplied to the load brake cylinder and manually operable valve means for controlling communication through which fluid from the empty brake cylinder is supplied to said valve device.

2. In a load brake apparatus, the combination with an empty brake cylinder and a brake lever operatively connected to said brake cylinder, of a load brake cylinder, a toothed bar operatively connected to said brake lever and a gear operatively connected to the load brake cylinder and meshing with the teeth of said bar.

3. In a load brake apparatus, the combination with a load brake cylinder, a piston therein, and a piston stem operable by said piston, of a toothed bar through which power is transmitted to apply the brakes, a gear meshing with the teeth of said bar, and means operatively connected to said stem for rotating said gear upon movement of said piston.

4. In a load brake apparatus, the combination with a load brake cylinder, a piston therein, and a piston rod operable by said piston, of a toothed bar for transmitting power to operate the brakes, a gear meshing with the teeth of said bar, a member rotatable with said gear, a pawl operated by said piston rod for rotating said member, and means for releasing said pawl from operative engagement with said member upon movement of said piston to release position.

5. In a load brake apparatus, the combination with a load brake cylinder, a piston therein, and a piston rod operable by said piston, of a toothed bar for transmitting power to operate the brakes, a gear meshing with the teeth of said bar, a ratchet wheel rotatable with said gear, and a pawl pivotally connected to said piston rod for engaging the teeth of said ratchet wheel to rotate said wheel upon movement of said piston rod by said piston.

6. In a load brake apparatus, the combination with a load brake cylinder, a piston therein, and a piston rod operable by said piston, of a toothed bar for transmitting power to operate the brakes, a gear meshing with the teeth of said bar, a ratchet wheel rotatable with said gear, a pawl pivotally connected to said piston rod for engaging the teeth of said ratchet wheel to rotate said wheel upon movement of said piston rod by said piston, and means for releasing said pawl from engagement with said ratchet wheel upon movement of said piston to release position.

In testimony whereof we have hereunto set our hands.

CLYDE C. FARMER.
THOMAS H. THOMAS.